US008289322B1

(12) United States Patent
Staten et al.

(10) Patent No.: US 8,289,322 B1
(45) Date of Patent: Oct. 16, 2012

(54) QUADRILATERAL FINITE ELEMENT MESH COARSENING

(75) Inventors: Matthew L. Staten, Pittsburgh, PA (US); Mark W. Dewey, Provo, UT (US); Steven E. Benzley, Provo, UT (US)

(73) Assignee: Sandia Corporation, Albuquerque, NM (US)

( * ) Notice: Subject to any disclaimer, the term of this patent is extended or adjusted under 35 U.S.C. 154(b) by 1215 days.

(21) Appl. No.: 11/874,008

(22) Filed: Oct. 17, 2007

(51) Int. Cl.
G06T 17/20 (2006.01)
(52) U.S. Cl. ....................................................... 345/423
(58) Field of Classification Search .................... 345/423
See application file for complete search history.

(56) References Cited

U.S. PATENT DOCUMENTS

| | | | |
|---|---|---|---|
| 6,996,505 B1 * | 2/2006 | Edelsbrunner et al. | ............ 703/2 |
| 7,098,912 B1 | 8/2006 | Borden et al. | |
| 7,181,377 B1 | 2/2007 | Borden et al. | |
| 7,219,039 B1 | 5/2007 | Shepherd et al. | |
| 7,400,323 B2 * | 7/2008 | Nigro | ............................ 345/420 |
| 7,733,338 B2 * | 6/2010 | Couture-Gagnon | .......... 345/419 |

OTHER PUBLICATIONS

Staten M., Benzley S., Scott M. (Jul. 16-22, 2006) Conformal Quadrilateral/ Hexahedral Mesh Coarsening. PowerPoint Presentation, WCCM VII, Los Angeles, California.
Plaza A, Carey GF. (1996) About local refinement of tetrahedral grids based on bisection. *Proc. 5th Int. Meshing Roundtable*, Sandia National Laboratories, Pittsburgh, PA, 123-136.
Plaza A, Rivara MC. (2003) Mesh refinement based on the 8-tetrahedra longest-edge partition. *Proc. 12th Int. Meshing Roundtable*, Sandia National Laboratories, Santa Fe, NM, 67-78.
De Cougny HL, Shephard MS. (1999) Parallel refinement and coarsening of tetrahedral meshes. *Int. J. Milner, Meth. Eng.*, 46(7):1101-1125.
Bey J. (1995) Tetrahedral grid refinement. *Computing*, 55(4): 355-378.
Grosso R, Lurig C, Ertl T. (1997) The multilevel finite element method for adaptive mesh optimization and visualization of volume data. *IEEE Visualization*, 387-394.
Molino N, Bridson R, Teran J, Fedkiw R. (2003) A crystalline, red green strategy for meshing highly deformable objects with tetrahedra. *Proc. 12th Int. Meshing Roundtable*, Sandia National Laboratories, Santa Fe, NM, 103-114.
Tchon K, Hirsch C, Schneiders R. (1997) Octree based hexahedral mesh generation for viscous flow simulations. *13th AIAA Computational Fluid Dynamics Conference*, AIAA-971980.
Staten M. (1996) Selective refinement of two and three-dimensional finite element meshes. M.S. Thesis, Brigham Young University, Provo, Utah.
Staten M. (1997) Local refinement of three-dimensional finite element meshes. *Eng. Comput.*, 13:165-174.
Marechal L. (2001) A new approach to octree-based hexahedral meshing. *Proc. 10th Int. Meshing Roundtable*, Sandia National Laboratories, Newport Beach, CA, 209-221.

(Continued)

*Primary Examiner* — Edward Martello
(74) *Attorney, Agent, or Firm* — Cory G. Claassen

(57) ABSTRACT

Techniques for coarsening a quadrilateral mesh are described. These techniques include identifying a coarsening region within the quadrilateral mesh to be coarsened. Quadrilateral elements along a path through the coarsening region are removed. Node pairs along opposite sides of the path are identified. The node pairs along the path are then merged to collapse the path.

22 Claims, 18 Drawing Sheets

INITIAL MESH

NON-LOCALIZED COARSENING

LOCALIZED COARSENING

OTHER PUBLICATIONS

Zhang Y, Bajaj C. (2004) Adaptive and quality quadrilateral/hexahedral meshing from volumetric data. *Proc. 13th Int. Meshing Roundtable*, Sandia National Laboratories, Williamsburg, VA, 365-376.

Schneiders R. (2000) An Algorithm for the Generation of Hexadedral Element Meshes based on an Octree Technique. *Int. J. Comput. Geom. Ap.*, 10(4): 383-398.

Kwak DY, IM YT. (2002) Remeshing for metal forming simulations—Part II: Three-dimensional hexahedral mesh generation. *Int. J. Numer. Meth. Eng.*, 53(11): 2501-2528.

Li H, Cheng G. (2000) New method for graded mesh generation of all hexahedral finite elements. *Comput. Struct.*, 76(6): 729-740.

Tchon K, Dompierre J, Camarero R. (2002) Conformal Refinement of all-quadrilateral and all-hexahedral meshes according to an anisotropic metric. *Proc. 11th Int. Meshing Roundtable*, Sandia National Laboratories, Ithaca, NY, 231-242.

Tchon K, Dompierre J, Camarero R. (2004) Automated refinement of conformal quadrilateral and hexahedral meshes. *Int. J. Numer. Meth. Eng.*, 59(12):1539-1562.

Borden M, Benzley S. Shepherd J. (2002) Hexahedral Sheet Extraction. *Proc. 11th Int. Meshing Roundtable*, Sandia National Laboratories, Ithaca, NY, 147-152.

Kallinderis Y, Kavouklis C. (2005) A dynamic adaptation scheme for general 3-D hybrid meshes. *Comput. Method Appl. M.*, 194:5019-5050.

Benzley S. Harris N, Scott M, Borden M, Owen S. (2005) Conformal Refinement and Coarsening of Unstructured Hexahedral Meshes. *J. of Comp. Information Sci. in Eng.*, 5(4): 330-337.

Tautges T, Blacker T, Mitchell S. (1996) The whisker weaving algorithm: A connectivity-based method for all-hexahedral finite element meshes. *Int. J. Numer. Meth. Eng.*, 39(19): 3327-3349.

Melander D, Tauges T, Benzley S. (1997) Generation of multi-million element meshes for solid model-based geometries: The dicer algorithm. ASME—*Trends in Unstructured Mesh Generation*, 220: 131-135.

Staten M, Canann S. (1997) Post refinement element shape improvement for quadrilateral meshes. ASME—*Trends in Unstructured Mesh Generation*, 220: 9-16.

Murdoch P, Benzley S, Blacker T, Mitchell S. (1997) The spatial twist continuum: A connectivity based method for representing all-hexahedral Finite element meshes. *Finite Elem. Anal. Des.*, 28(2):137-149.

Blacker T., The Cooper Tool. (1996) *Proc. 5th Int. Meshing Roundtable*, Sandia National Laboratories, Pittsburgh, PA, 13-29.

Staten M., Cannan S., Owen S. (1998) BMSweep: Locating interior nodes during sweeping. *Proc. 7th Int. Meshing Roundtable*, Dearborn, MI, 7-18.

* cited by examiner

QUADRILATERAL MESH ELEMENT

QUADRILATERAL CHORD SHADED GRAY

MESH

MESH DUAL

CHORD EXTRACTION FROM QUADRILATERAL MESH

CHORD DICING IN A QUADRILATERAL MESH

ELEMENT COLLAPSE

QUADRILATERAL FINITE ELEMENT MESH COARSENING

STATEMENT REGARDING FEDERALLY SPONSORED RESEARCH

This invention was made with Government support under Contract No. DE-AC04-94AL85000 between Sandia Corporation and the U.S. Department of Energy. The U.S. Government has certain rights in this invention.

TECHNICAL FIELD

This disclosure relates generally to finite element analysis and continuum mechanics, and in particular but not exclusively, relates to mesh coarsening of finite element meshes.

BACKGROUND INFORMATION

Finite element analysis (FEA) is the process of creating a finite element mesh ("FEM"), which represents a physical domain upon which some physical phenomenon is to be analyzed. These domains can be broken up into either two dimensional ("2D") or three dimensional ("3D") domains. 3D domains represent the full-3D dimensions of an actual 3D domain. 3D domains are most often modeled with either tetrahedral or hexahedral elements. Less often, 3D domains are modeled with pyramid or wedge elements. FIG. 1 illustrates these four basic element types.

2D domains represent a physical phenomenon which is geometrically located in some kind of surface (either planar or non-planar), such as surface wave front propagation in liquids, or a thin sheet metal object such as the hood of a car. In addition, 2D domains are used to represent a simplification of a 3D domain, such as a cross-section of a 3D domain. 2D domains are most often modeled with either quadrilateral or triangular elements. FIG. 2 illustrates these 2D element types.

FEMs are typically composed of a single element type. For example, a hexahedral mesh is composed of only hexahedral elements. A "hybrid" mesh is a mesh composed of more than a single element type. For most FEA solvers, a non-hybrid mesh is preferred. Many FEA solvers do not support hybrid meshes.

During the process of FEA, it may become necessary to modify the density of mesh elements in a local region of a mesh in order to better adapt the mesh to the physics being modeled in the analysis. Refinement is the process of adding elements to the mesh. Coarsening is the process of removing elements from the mesh. There are many types of refinement and coarsening. However, for many applications, the most applicable types of refinement and coarsening are those that (1) are conformal, (2) are localized, (3) maintain the original mesh element type (i.e., non-hybrid), and (4) are independent of prior refinements.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a technique for mesh coarsening of finite element meshes ("FEMs") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

DEFINITIONS

Throughout this specification, several terms of art are used. These terms are to take on their ordinary meaning in the art from which they come, unless specifically defined herein or the context of their use would clearly suggest otherwise.

Quadrilateral Mesh: A quadrilateral mesh is a two-dimensional ("2D") finite element mesh ("FEM") formed of a plurality of quadrilateral elements linked together on a planar or non-planar surface.

Hexahedral Mesh: A hexahedral mesh is a three-dimensional ("3D") FEM formed of a plurality of hexahedron elements linked together.

Mesh Coarsening: Mesh coarsening is the act of reducing the number of mesh elements in a FEM.

Mesh Refinement: Mesh refinement is the action of increasing the number of mesh elements in a FEM.

Figure 1:
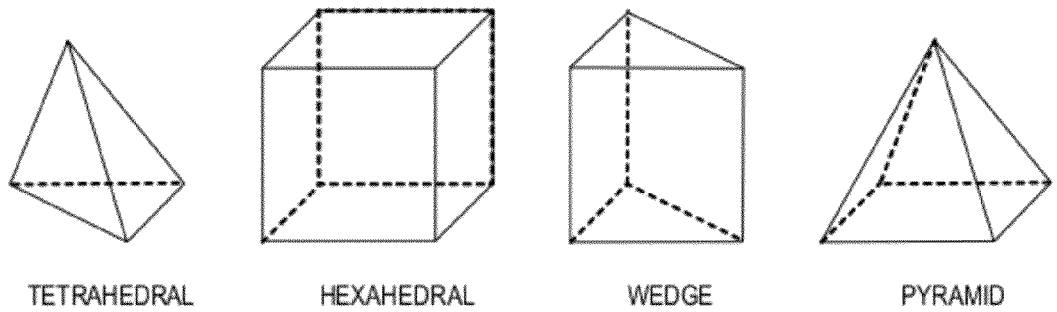
FIG. 1 (prior art) illustrates some of the basic mesh elements of three-dimensional finite element meshes ("FEMs").
Figure 2:
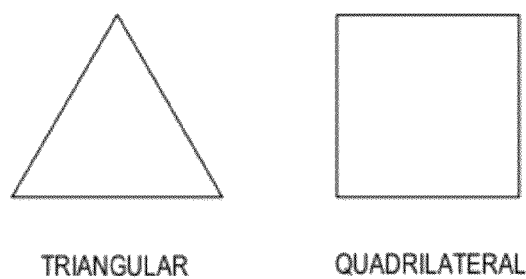
FIG. 2 (prior art) illustrates some of the basic mesh elements of two-dimensional FEMs.
Figure 3:
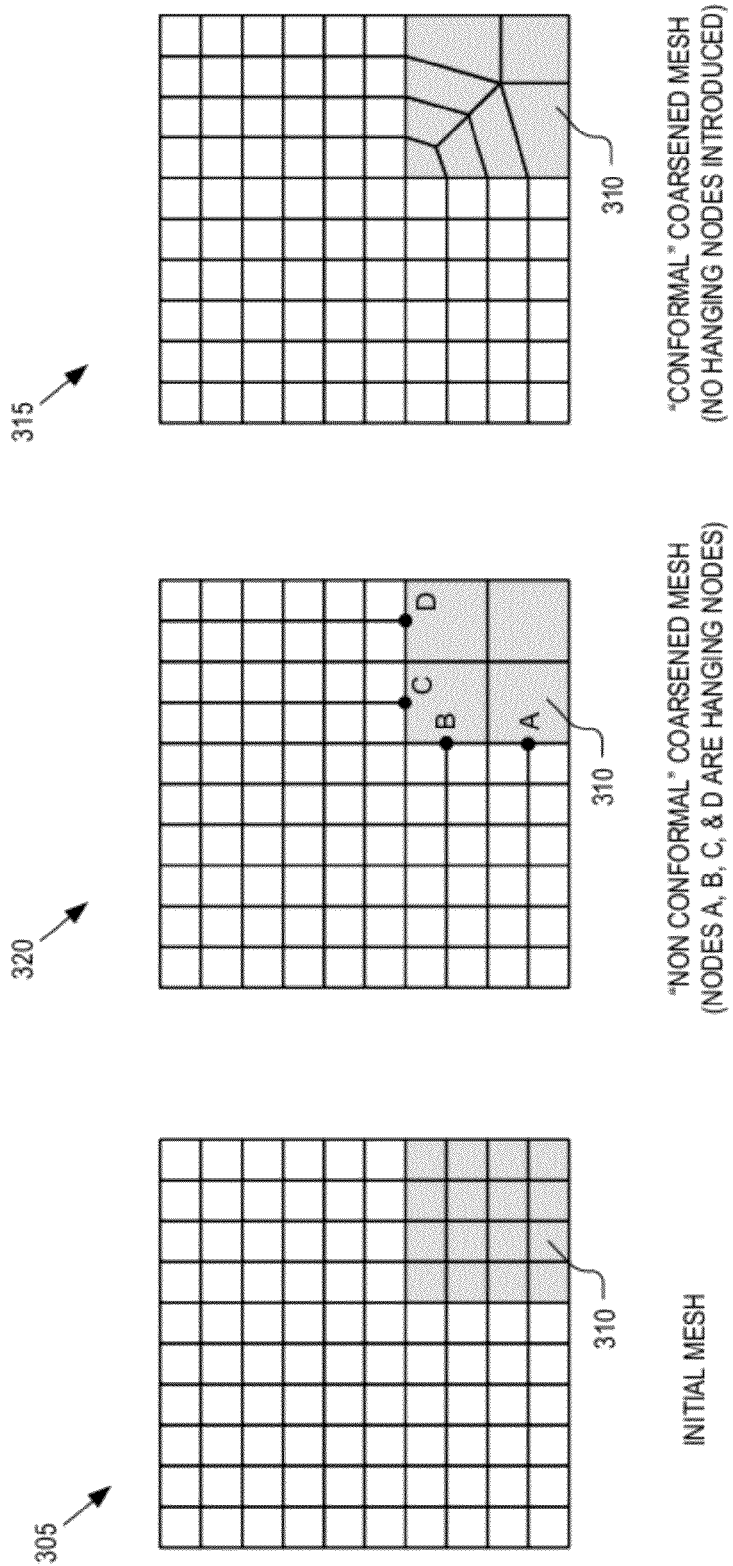
FIG. 3 illustrates conformal coarsening, in accordance with an embodiment of the invention.

Conformal Coarsening: A conformal mesh is a mesh which contains no "hanging nodes." A hanging node is a node that is spatially adjacent to a mesh element, but is not used as one of the corners or vertices of that mesh element. FIG. 3 illustrates an initial mesh 305 with a localized region 310 shaded. Localized region 310 indicates where mesh coarsening is to be performed. Both conformal coarsening (coarsened mesh 315) and non-conformal coarsening (coarsened mesh 320) of initial mesh 305 are illustrated. Non-conformal coarsening introduces hanging nodes. Conformal coarsening does not. Only a few FEM solvers support hanging nodes and non-conformal meshes. As a result, a coarsening procedure that introduces hanging nodes is only usable by some solvers. In addition, even if the FEM solver does support hanging nodes, the solution in these regions is often compromised because of the discontinuity in the mesh connectivity. As a result, a conformal coarsening procedure is often preferred.

Figure 4:
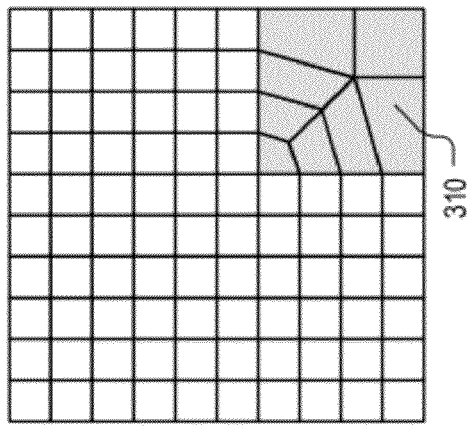
FIG. 4 illustrates localized and non-localized coarsening, in accordance with an embodiment of the invention.
Figure 4:
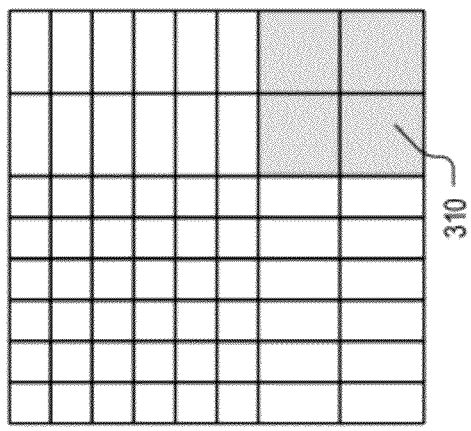
Figure 4:
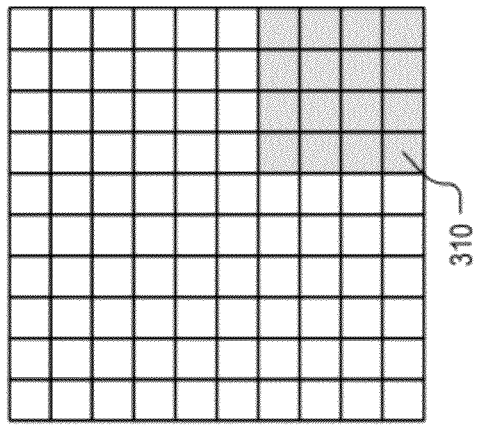

Localized Coarsening: Non-localized mesh coarsening is where mesh elements are removed from parts of the mesh where coarsening is not desired as a side-affect of removing elements from a coarsening region. FIG. 4 illustrates both local and non-local coarsening. By not keeping the coarsening local, mesh elements are removed from parts of the mesh where coarsening was not requested. These other parts of the mesh may be critical to the FEA and the removal of elements from these other regions may compromise the quality of the solution. As a result, a coarsening procedure which only removes elements from a localized region where it is specified is usually preferred.

Figure 5:
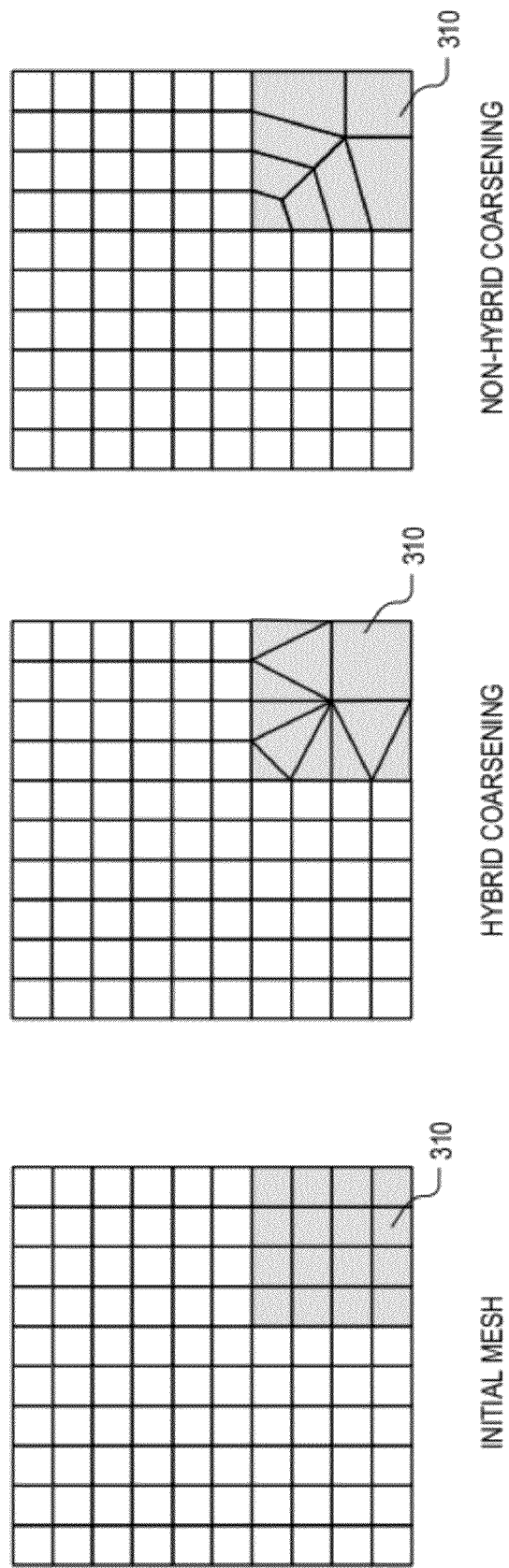
FIG. 5 illustrates hybrid and non-hybrid coarsening, in accordance with an embodiment of the invention.

Hybrid Coarsening: Hybrid mesh coarsening is where mesh elements are removed, but new element types are introduced in order to maintain a conformal mesh. FIG. 5 illustrates both hybrid and non-hybrid (e.g., all-quadrilateral) mesh coarsening. In hybrid coarsening of a quadrilateral mesh, triangular elements may be introduced. In 3D, hybrid coarsening introduces other element types such as pyramids, wedges, and tetrahedra. For many applications, all-quadrilateral/hexahedral elements are often superior in solution quality, if not required. As a result, the introduction of other mesh element types may compromise the quality of the FEA answers. Thus, a coarsening procedure which maintains the original mesh element types is often preferred.

Figure 6:
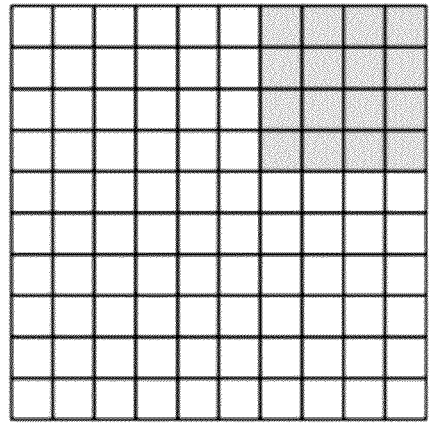
FIG. 6 illustrates a mesh coarsening which is dependent upon a previous refinement, in accordance with an embodiment of the invention.
Figure 6:
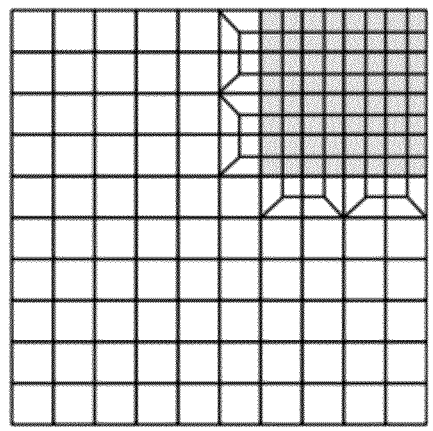
Figure 6:
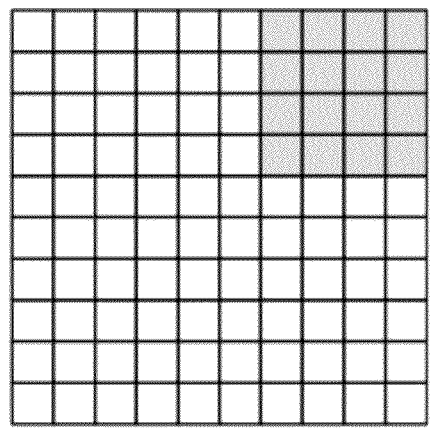

Coarsening Independent of Prior Refinements: Often, coarsening is requested in a localized region of a mesh that was previous refined. In this case, coarsening can be done by remembering how the prior refinement was done, and simply undoing it. This is illustrated in FIG. 6. Although this is a valid method of coarsening, coarsening is often desired in regions that have no prior refinements to undo, or only a portion of a prior refinement is to be removed. In addition, if this method is implemented in a parallel processing system, information regarding prior refinements may reside on another processor, requiring potentially expensive processor communication. Thus, a method which does not rely on any prior refinements and can do coarsening on any mesh regardless of its origin is often preferred.

Figure 7:
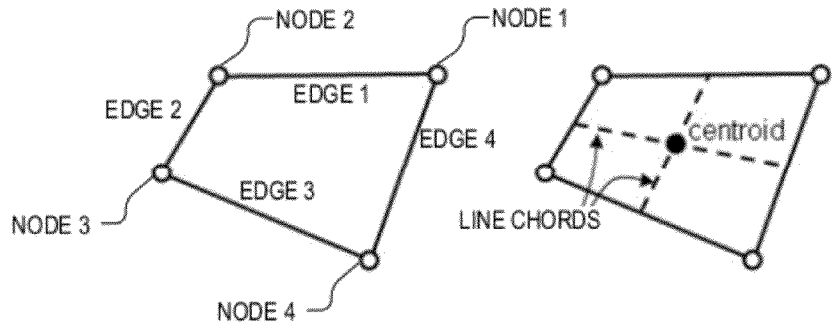
FIG. 7 illustrates a quadrilateral mesh element, in accordance with an embodiment of the invention.

Quadrilateral Mesh Element: FIG. 7 illustrates a single quadrilateral mesh element. As shown, it is defined by four nodes at each of its four corners, and four edges, which represent the sides of the mesh element. In a conformal quadrilateral mesh, each "internal" edge in the mesh is shared by exactly 2 quadrilateral elements. As such, given a quadrilateral element and one of its edges, it is easy to find the other quadrilateral attached to that edge. In addition, given a quadrilateral element, and one of its edges, it is easy to find the "opposite" edge or the other edge of the quadrilateral that does not share any nodes with the given edge. For example, in FIG. 7 edge 1 is opposite edge 3 and visa versa. Likewise, edge 2 is opposite edge 4.

Chord: A chord is a collection of mesh elements connected through opposite edges and which starts and stops on a terminal boundary of the mesh or loops back on itself.

Line Chord: A line chord is a type of chord. A line chord is a collection of lines connecting the midpoints of opposite edges of mesh elements and which starts and stops on a terminal boundary of the mesh or loops back on itself. FIG. 7 illustrates two line chords.

Figure 8:
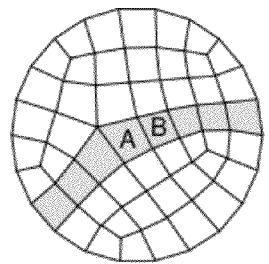
FIG. 8 illustrates a quadrilateral chord, in accordance with an embodiment of the invention.

Quadrilateral Chord: A quadrilateral chord is a type of chord. A quadrilateral chord is a collection of quadrilateral elements which form a chain connected through opposite edges that starts and stops on a boundary or loops back on itself. Quadrilateral chords are also referred to as "quadrilateral columns." A quadrilateral chord is defined by selecting a starting edge in a quadrilateral mesh along with its 2 adjacent quadrilateral elements (elements A and B for example in FIG. 8). The opposite edges to the starting edge are then found in each adjacent element, along with their adjacent quadrilaterals. This propagation continues until edges on the terminal boundary of the mesh are found, or until the chord wraps back onto itself.

Figure 9:
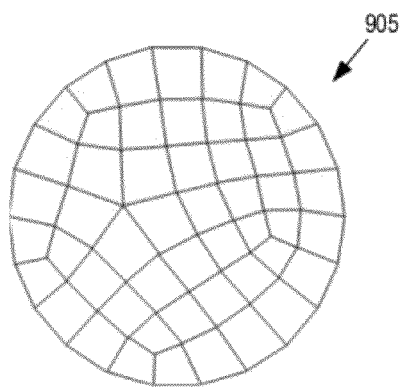
FIG. 9 illustrates a quadrilateral mesh and its mesh dual, in accordance with an embodiment of the invention.
Figure 9:
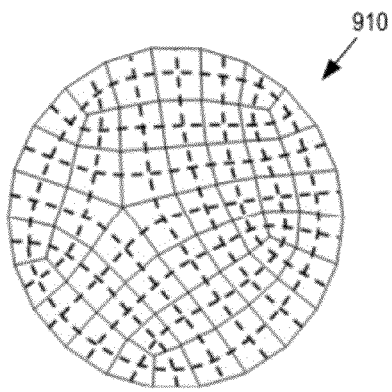

Mesh Dual: FIG. 9 illustrates a simple conformal quadrilateral mesh 905 and its mesh dual 910. In conformal quadrilateral meshes, the line chords (illustrated as dashed lines) in individual mesh elements combine into continuous line chord which wind and twist through the mesh. The number of chords in a mesh is defined by equation 1, where $P_{boundary}$ is the number of chords which start and stop on a boundary edge and $P_{circular}$ is the number of chords which close upon themselves.

$$P_{total} = P_{boundary} + P_{circular} \quad \text{(Equation 1)}$$

Each chord dual forms a new mesh column or "quadrilateral column." The total number of mesh elements in a quadrilateral mesh can then be defined by equation 2, where N is the number of mesh elements in the mesh column defined by chord i.

$$N_{total} = \frac{1}{2} \sum_{i=1}^{P_{total}} N_i \quad \text{(Equation 2)}$$

Figure 10:
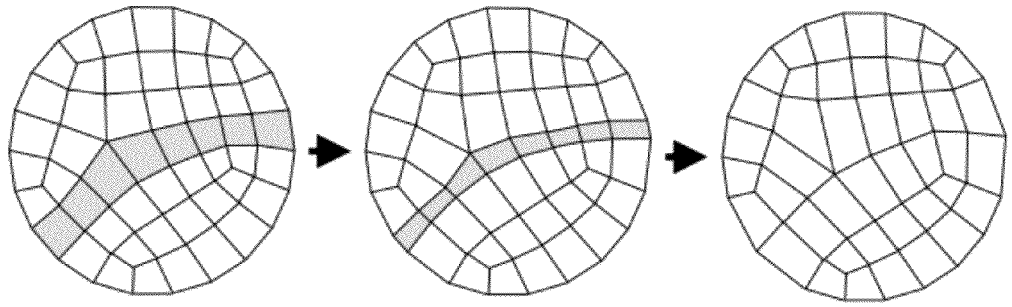
FIG. 10 illustrates a chord extraction operation in a quadrilateral mesh, in accordance with an embodiment of the invention.

Chord Extraction: Chord extraction is the conformal extraction of the mesh elements in a chord. Each of the edges, which define a chord are identified. Each edge is defined by two nodes for a quadrilateral mesh. These two nodes are spatially moved until they occupy the exact same spatial location. The connectivity of mesh elements is then adjusted to remove one of these nodes from the mesh. Quadrilateral chord extraction (also referred to as "quadrilateral column collapse") in a quadrilateral mesh is illustrated in FIG. 10. Chord extraction may provide non-localized coarsening since the mesh elements removed include all mesh elements in the quadrilateral chord, regardless of whether they are in the desired coarsening region or not.

Figure 11:
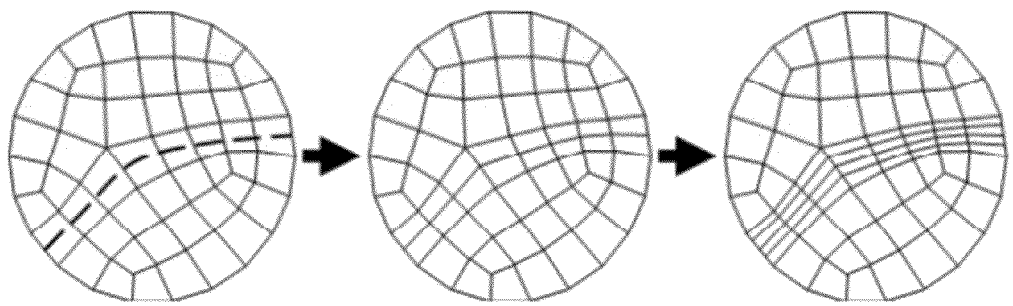
FIG. 11 illustrates a chord dicing operation in a quadrilateral mesh, in accordance with an embodiment of the invention.

Chord Dicing: A chord in a quadrilateral mesh can also be diced, or subdivided any number of times. In a quadrilateral mesh, there are a series of edges which are perpendicular to a chord running through the mesh. By splitting each of these edges, and connecting the split points of adjacent edges, the chord is diced. FIG. 11 illustrates two iterations of a dicing operation performed on a quadrilateral mesh dual chord. The dicing of a dual chord increases the number of elements in the mesh by $N_i$. However, like chord extraction, the affect is along the entire length of the chord.

Figure 12:
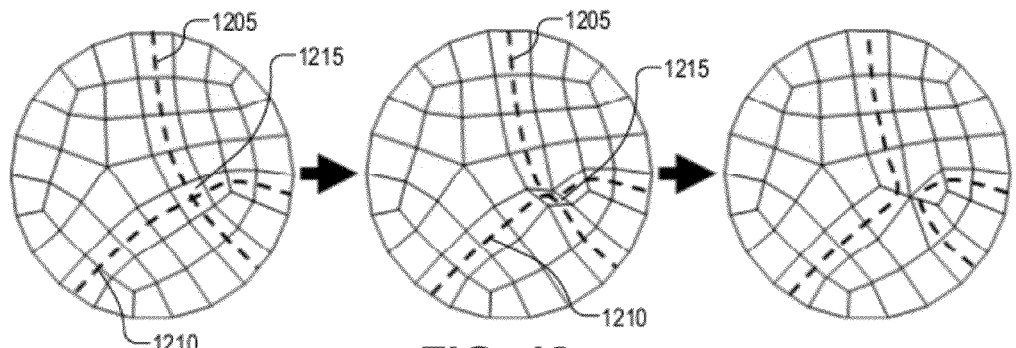
FIG. 12 illustrates an element collapse operation in a quadrilateral mesh, in accordance with an embodiment of the invention.

Mesh Element Collapse: FIG. 12 illustrates that each quadrilateral element in a quadrilateral mesh resides at the intersection of two dual chords 1205 and 1210. The mesh element 1215 residing at the intersection of these dual chords can be removed by performing an element collapse operation. A mesh element is collapsed in a quadrilateral mesh by merging two opposite nodes of the quadrilateral element, as shown in FIG. 12. The element collapse operation reduces the number of elements in the mesh by one and the reconfigured mesh dual chords no longer intersect.

Figure 13A:
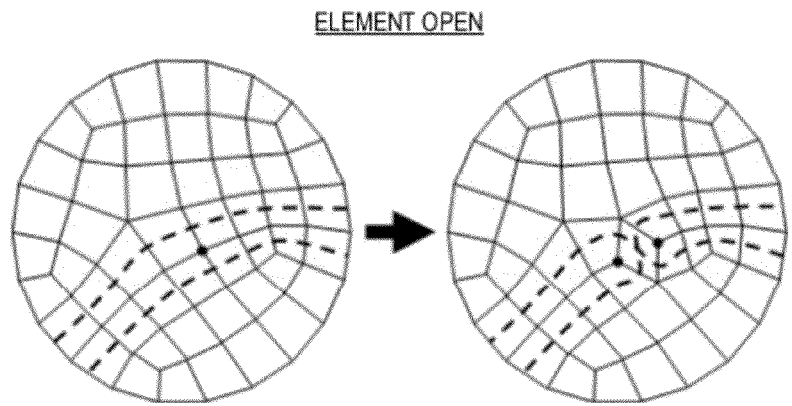
FIG. 13A illustrates an element open operation in a quadrilateral mesh, in accordance with an embodiment of the invention.
Figure 13B:
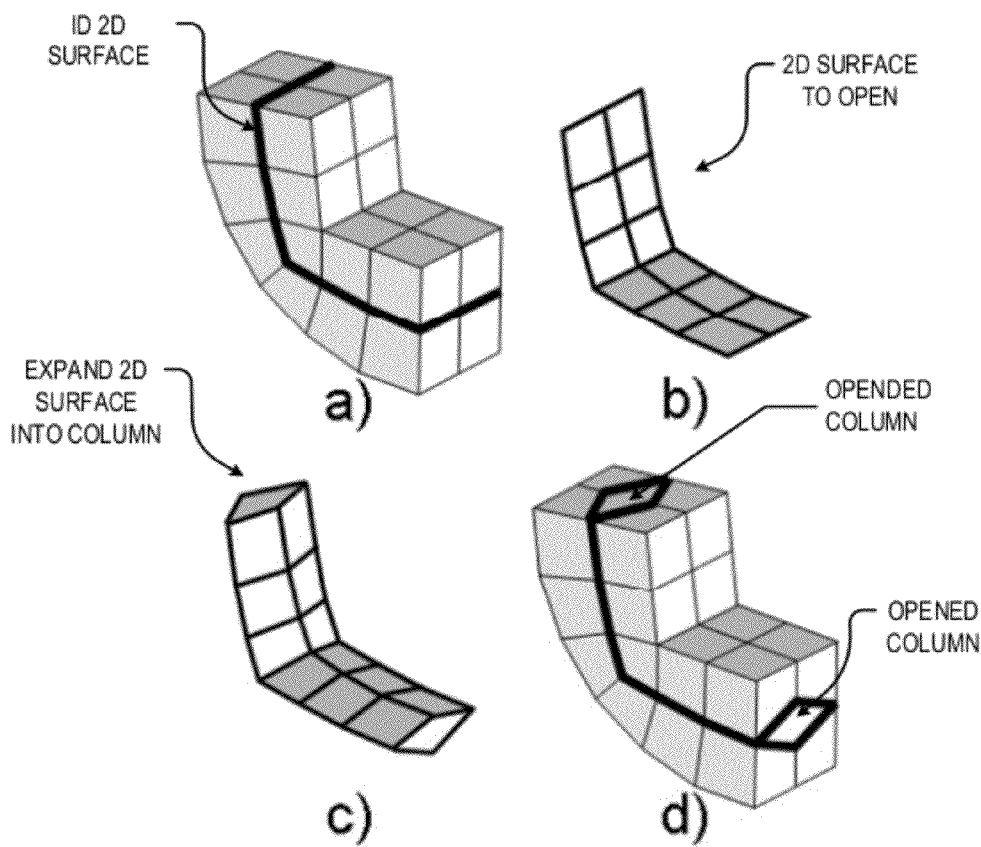
FIG. 13B illustrates a column open operation in a hexahedral mesh, in accordance with an embodiment of the disclosure.

Mesh Element Open: The element open operation has the inverse affect of the element collapse operation. Two dual chords which previously did not cross can be redirected so that they do cross as illustrated in FIG. 13A. A 3D corollary operation is the "column open" operation for inserting a hexahedral column into a hexahedral mesh as illustrated in FIG. 13B. In the column open operation, a 2D surface of quadrilaterals (quadrilateral column) is identified. The 2D surface is then opened by expanding a series of nodes within the identified quadrilateral column into two separate sets of nodes to create the opened column. Hexahedral columns are defined in connection with FIG. 16 below.

Figure 14A:
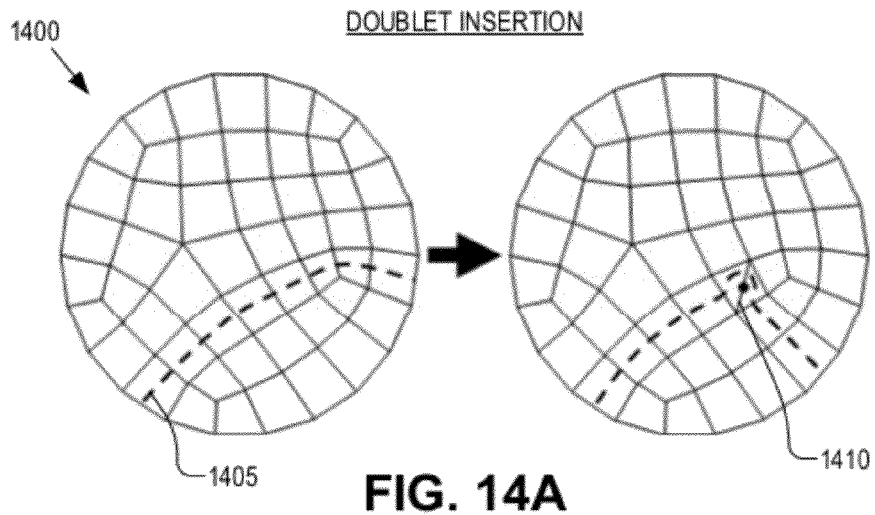
FIG. 14A illustrates a doublet insertion operation in a quadrilateral mesh, in accordance with an embodiment of the invention.
Figure 14B:
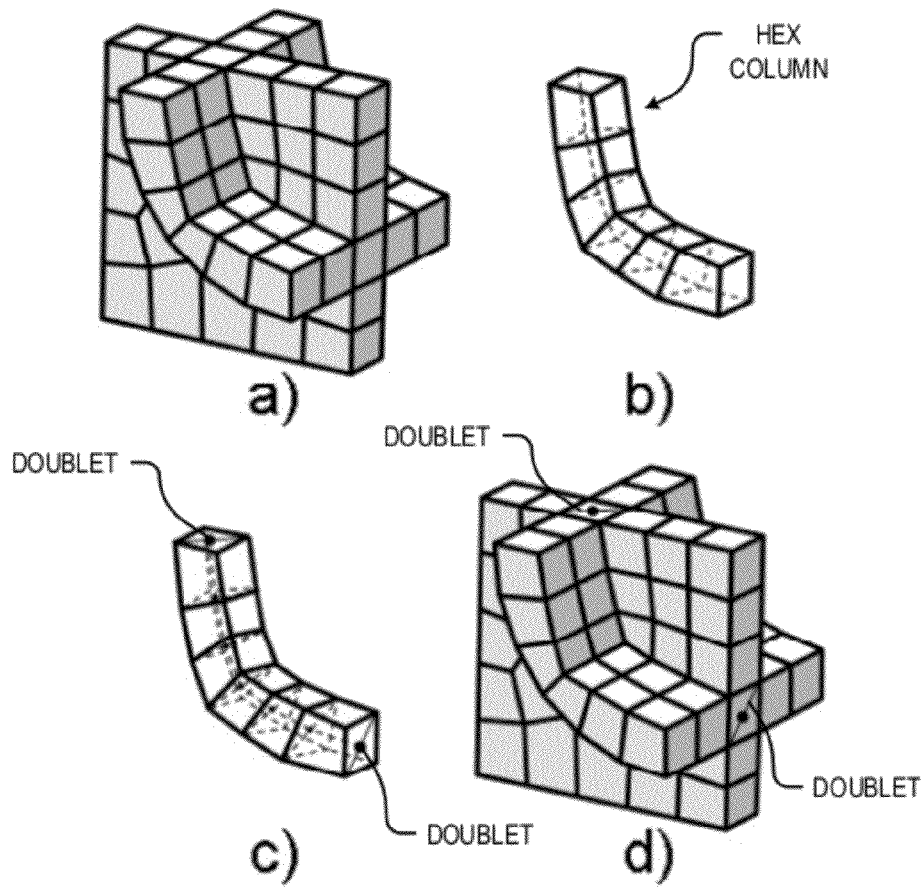
FIG. 14B illustrates a column doublet insertion operation in a hexahedral mesh, in accordance with an embodiment of the disclosure.

Doublet Insertion/Deletion: Another operation which modifies a mesh dual is the doublet insertion. A doublet is inserted by inserting two edges and a node on a line that connects two opposite nodes of a quadrilateral element. This line is referred to as a "doublet." FIG. 14A illustrates a line chord 1405 in a quadrilateral mesh 1400 and a doublet insertion performed on one of the quadrilateral elements associated with line chord 1405 to create doublet 1410. The two new quads share two edges which results in poor mesh quality. This operation creates an imperfect mesh because of the poorly shaped new elements that are formed. However, doublet insertion is often just an intermediate step and one of the resulting chords may ultimately be removed, leaving a valid mesh, as well as, enabling a coarsening operation. The value in the doublet insertion is its affect on the mesh dual. The doublet insertion operation increases the number of elements in the mesh by one. Doublet removal is the reverse operation, which removes two edges and a node. A 3D corollary to the doublet insertion is the "column doublet insertion" operation. In the column doublet insertion, the doublets are inserted within each mesh element along a hexahedral column through a hexahedral mesh, as illustrated in FIG. 14B. Hexahedral columns are defined in connection with FIG. 16 below.

Figure 15A:
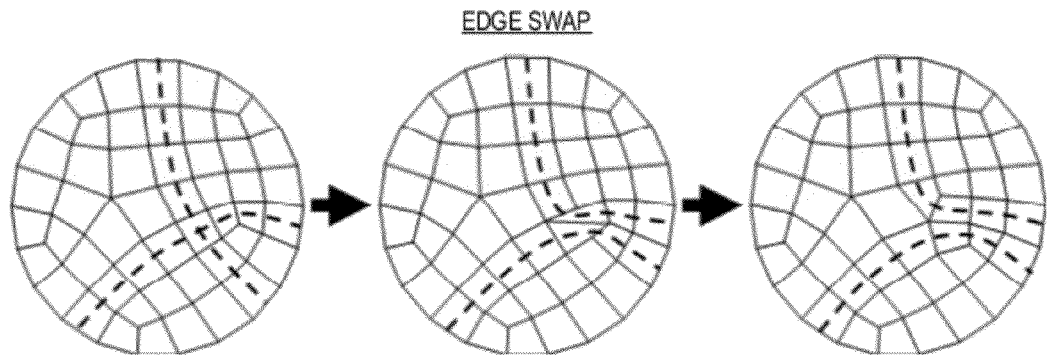
FIG. 15A illustrates an edge swap operation in a quadrilateral mesh, in accordance with an embodiment of the invention.
Figure 15B:
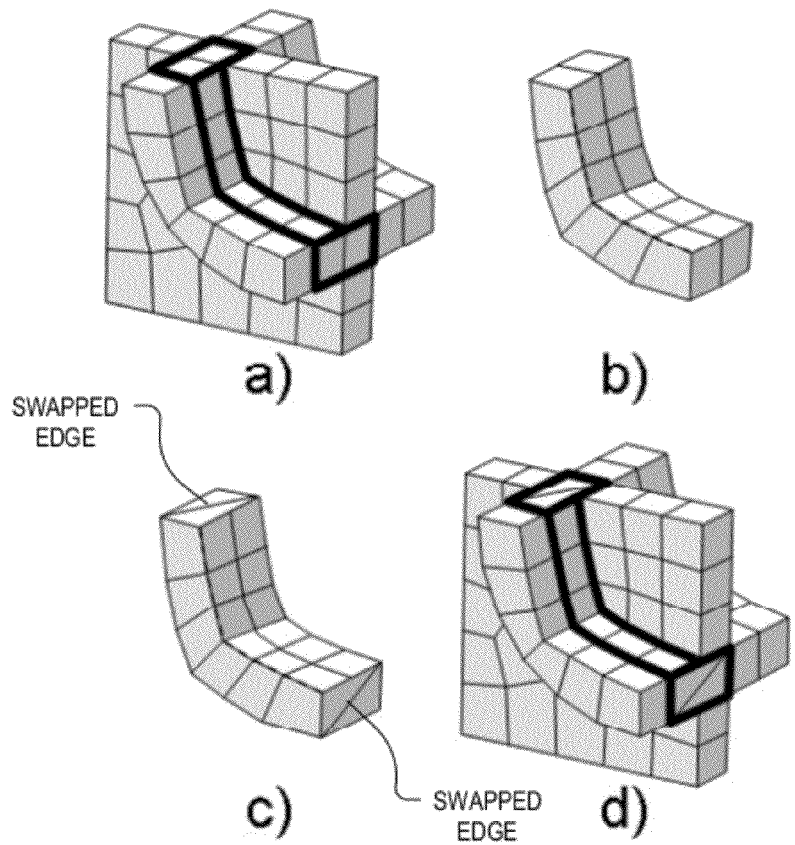
FIG. 15B illustrates a face swap operation in a hexahedral mesh, in accordance with an embodiment of the disclosure.

Edge Swap: An element edge swap in a quadrilateral mesh is performed by reconfiguring the nodes of two adjacent quadrilateral elements such that the edge between them is defined by two different nodes. FIG. 15A illustrates the element edge swap. Note that the element edge swap operation removes the intersection between two dual chords. The edge swap operation does not change the number of mesh elements in a mesh. A 3D corollary to the edge swap is the "face swap" operation. In the face swap operation, a series of edges along a hexahedral column through a hexahedral mesh is swapped, as illustrated in FIG. 15B. Hexahedral columns are defined in connection with FIG. 16 below.

Figure 16:
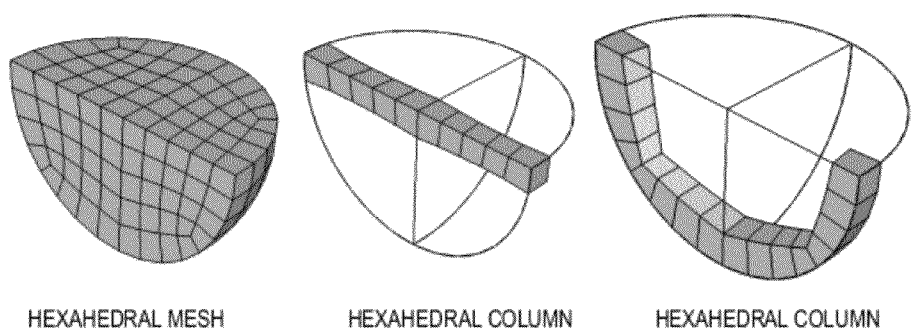
FIG. 16 illustrates hexahedral columns in a hexahedral mesh, in accordance with an embodiment of the disclosure.

Hexahedral Column: A hexahedral column is the 3D corollary to the 2D quadrilateral column or quadrilateral chord. A column of hexahedra is a collection of hexahedral mesh elements that form a chain of opposite faces on adjacent hexahedral elements and, which starts and stops on a terminal boundary of the mesh or loops back on itself. FIG. 16 illustrates an example hexahedral mesh and two of its hexahedral columns.

Figure 17:
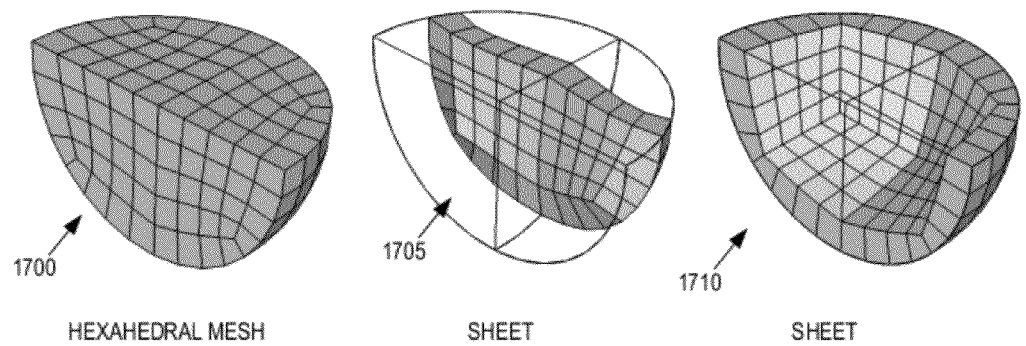
FIG. 17 illustrates a sheet in a hexahedral mesh, in accordance with an embodiment of the disclosure.
Figure 18:
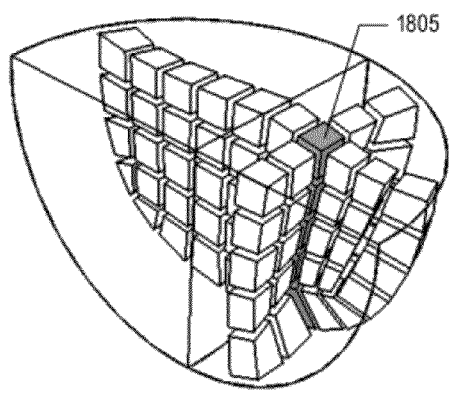
FIG. 18 illustrates how the intersection of two sheets in a hexahedral mesh defines a hexahedral column, in accordance with an embodiment of the disclosure.

Sheet: Similar to a column, a sheet in a hexahedral mesh is a collection of hexahedral elements which share opposite faces of the hexahedral elements in two separate directions creating a two dimensional surface, and which starts and stops on a terminal boundary of the mesh or loops back on itself. Two example sheets 1705 and 1710 within a hexahedral mesh 1700 are illustrated in FIG. 17. The intersection of two sheets forms a hexahedral column 1805 as illustrated in FIG. 18. A sheet is a 3D subset of a chord.

Figure 19:
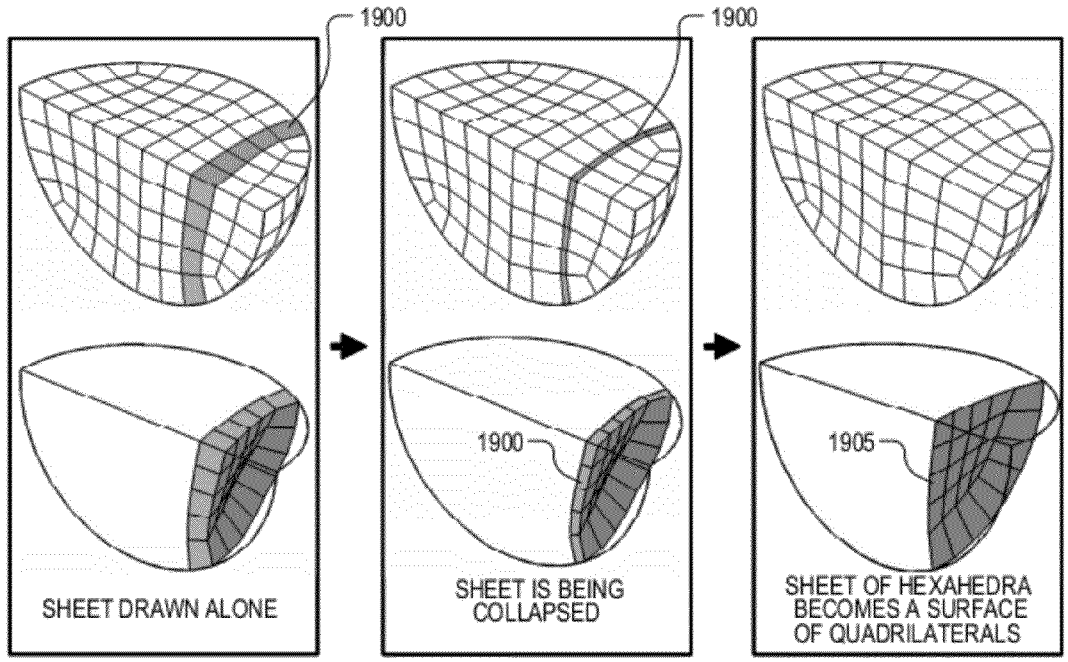
FIG. 19 illustrates a sheet extraction operation in a hexahedral mesh, in accordance with an embodiment of the disclosure.

Sheet Extraction: Similar to chord extraction, a sheet can be conformaly extracted from a hexahedral mesh by collapsing the edges that define the sheet. In FIG. 19, sheet 1900 is extracted from the hexahedral mesh by collapsing it into a surface 1905 of interconnected quadrilaterals.

Figure 20:
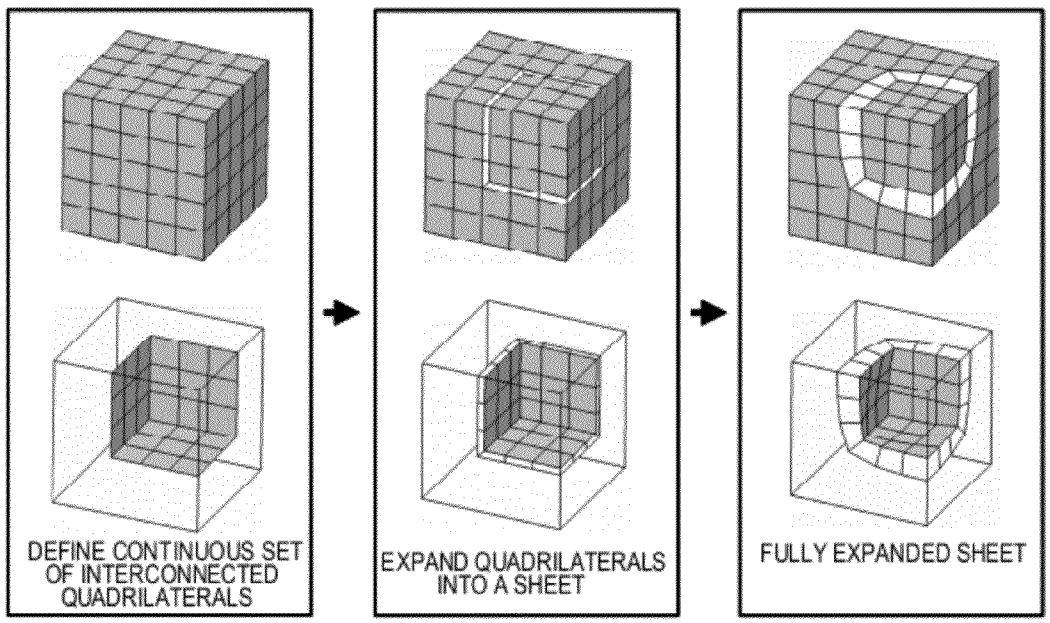
FIG. 20 illustrates a sheet insertion or "pillowing" operation in a hexahedral mesh, in accordance with an embodiment of the disclosure.

Sheet Insertion (a.k.a. "Pillowing"): FIG. 20 illustrates the sheet insertion operation. As can be seen, sheet insertion is the opposite of sheet extraction. In sheet extraction, a sheet of hexahedra is collapsed into a continuous set of interconnected quadrilateral faces. In contrast, sheet insertion starts from a continuous set of interconnected quadrilateral faces and expands it into a sheet of hexahedral elements.

Figure 21:
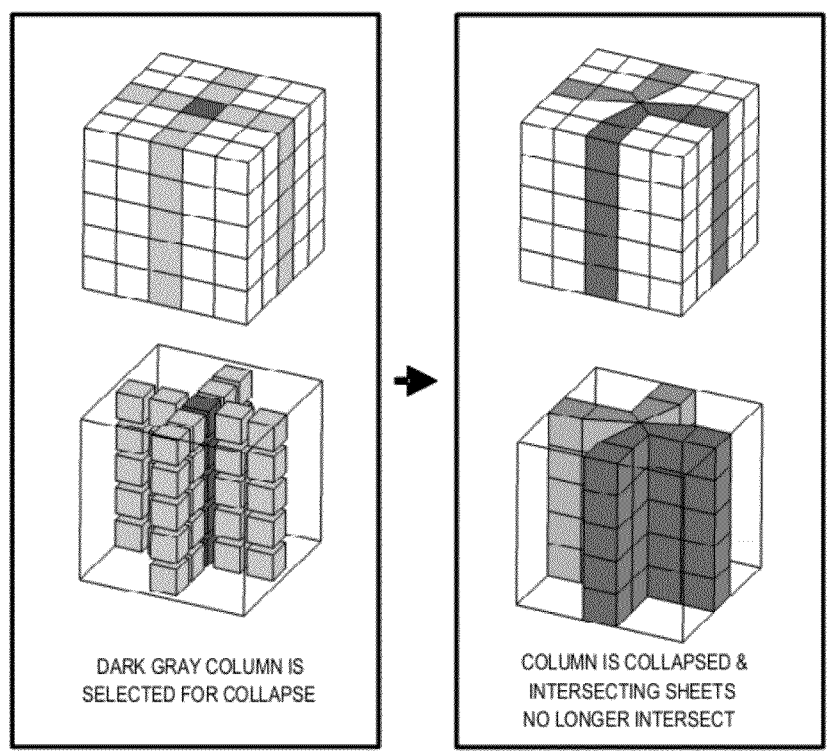
FIG. 21 illustrates a hexahedral column collapse operation in a hexahedral mesh, in accordance with an embodiment of the disclosure.

Hexahedral Column Collapse: The column collapse operation is illustrated in FIG. 21. A hexahedral column is the intersection of two hexahedral sheets. By collapsing the column, the intersection of the two sheets is removed, and the paths of the sheets are modified. Hexahedral column collapse is the 3D corollary in a hexahedral mesh to the 2D mesh element collapse, as illustrated in FIG. 12.

Mesh Coarsening

The definition section above defines a number of simplex chord operations, including chord extraction and presents operations that can be used to modify the mesh dual in order to control the path of chord duals. These concepts can be combined to produce a localized conformal mesh coarsening technique.

Figure 22:
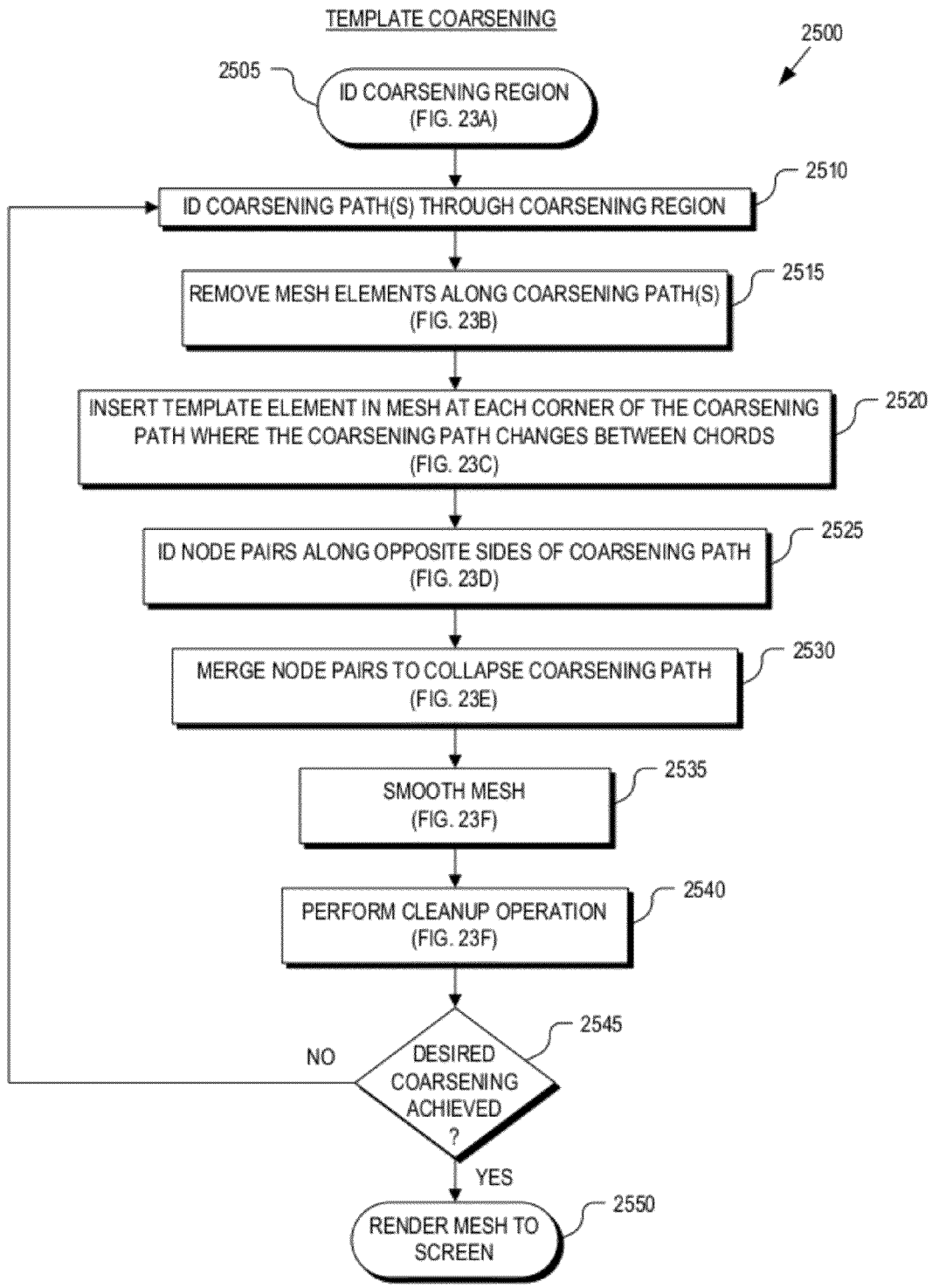
FIG. 22 is a flow chart illustrating a process for a template coarsening technique, in accordance with an embodiment of the invention.
Figure 23:
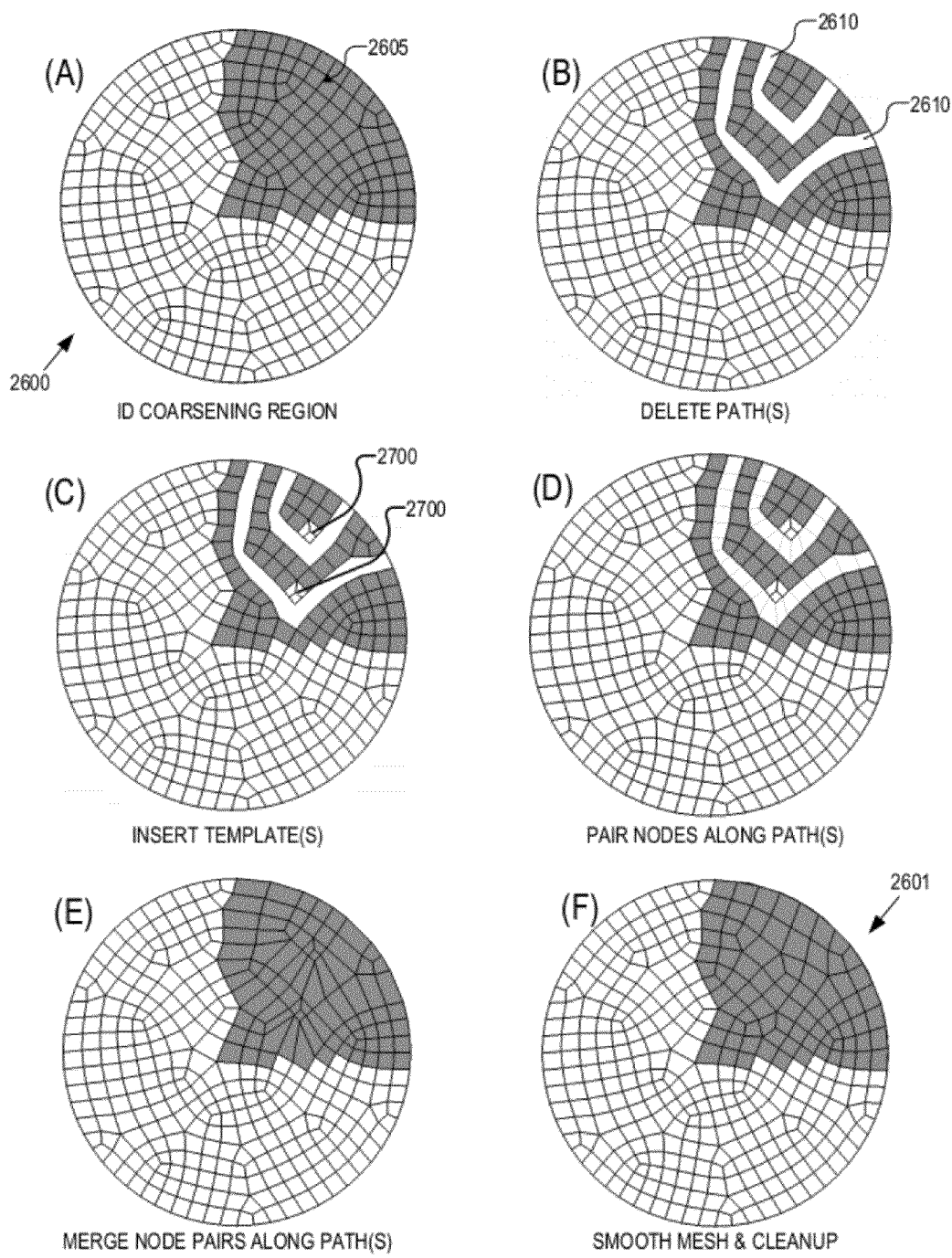
FIGS. 23A-F illustrate the template coarsening technique, in accordance with an embodiment of the invention.

FIG. 22 is a flow chart illustrating a process 2500 for coarsening a quadrilateral mesh using a template coarsening technique, in accordance with an embodiment of the invention. Process 2500 is described in connection with FIGS. 23 and 24. The order in which some or all of the process blocks appear in process 2500 should not be deemed limiting. Rather, one of ordinary skill in the art having the benefit of the present disclosure will understand that some of the process blocks may be executed in a variety of orders not illustrated.

The template coarsening technique begins by identifying a coarsening region 2605 localized within a portion of initial mesh 2600 (process block 2505). In the illustrated embodiment, initial mesh 2600 is a non-hybrid, conformal, quadrilateral mesh. In a process block 2510, coarsening paths 2610 through coarsening region 2605 are identified and the constituent mesh elements removed (process block 2515). Coarsening paths 2610 are formed by a series of continuous mesh element chained together and can even be formed by portions of one or more intersecting quadrilateral chords. At the corners or locations where each coarsening path 2610 changes from one chord to the next, a template element is inserted into the mesh (process block 2520).

Figure 24:
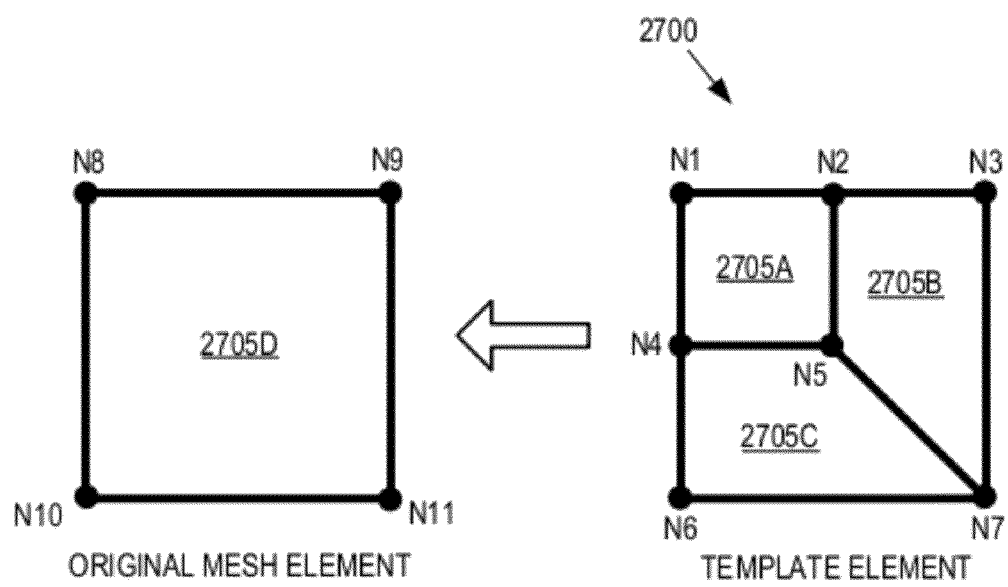
FIG. 24 illustrates an example template element for use with the template coarsening technique in quadrilateral meshes, in accordance with an embodiment of the invention.

FIG. 24 illustrates an example template element 2700 that can be inserted at the corners of coarsening paths 2610. Template element 2700 includes three quadrilateral elements 2705A, 2705B, and 2705C connected by seven nodes N1-N7. Template element 2700 is inserted into the mesh and replaces a single quadrilateral element 2705D having just four nodes N8-N11. The corners of coarsening paths 2610 are the positions in the deleted quadrilateral chains where a switch from one chord to another occurred.

It is at the switch from one chord to another that the one-to-one node pairs are disrupted. The insertion of template element 2700 restores the one-to-one node pairs as illustrated in FIG. 23D. In a process block 2525, mesh nodes along opposite sides of coarsening paths 2610 are identified and paired. In a process block 2530, each of the node pairs are merged into a single node to collapse coarsening path 2610 and repair the mesh. Once coarsening paths 2610 have been collapsed, a smoothing operation may be applied to the coarsened mesh to more evenly distribute the mesh elements (process block 2535). In a process block 2540, if any irregular nodes (nodes having more or less than four adjacent mesh elements) were created during coarsening, then cleanup operations are performed to remove the irregular nodes within coarsened mesh 2601.

If additional coarsening within coarsening region 2605 is desired (decision block 2545), then process 2500 can be iterated multiple times until the desired degree of coarsening is achieved. In a process block 2550, the final coarsened mesh 2601 is rendered to a display screen or written to disk or memory. It should be appreciated that intermediate coarsened meshes may also be rendered to a display screen for each iteration, if so desired. Furthermore, smoothing and cleanup may be performed with each iteration (as illustrated), or once upon completion of the final iteration.

The template coarsening technique is a general technique that can be applied to any quadrilateral mesh. The quality of the resulting mesh is dependent on the smoothness of the continuous quadrilateral paths chosen. If paths are chosen that repeatedly jump from chord-to-chord, an excessive amount of templates may be required, minimizing the coarsening effect and can result in many odd-valent nodes requiring extensive cleanup to remove.

Figure 25:
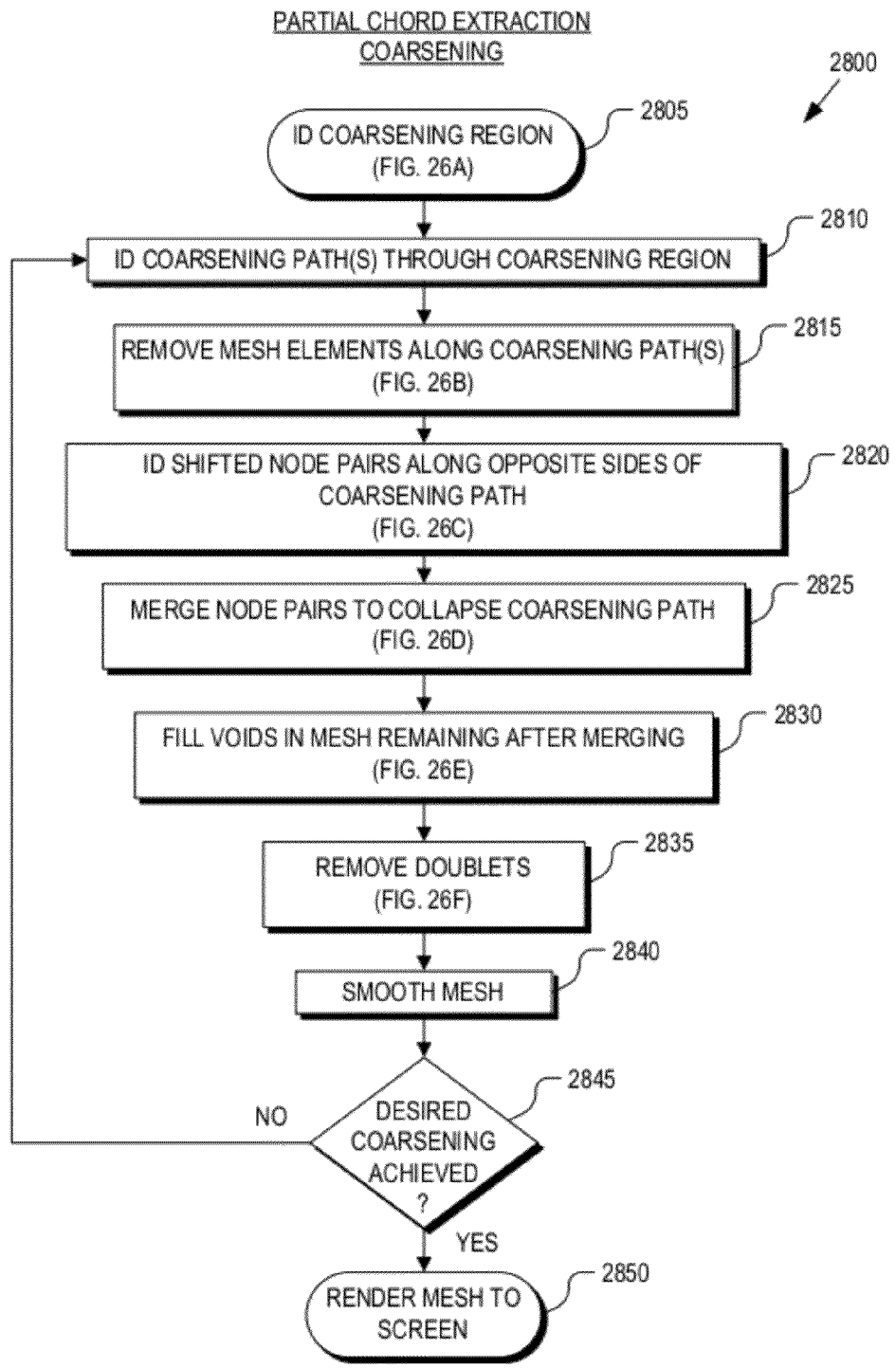
FIG. 25 is a flow chart illustrating a process for a partial chord extraction coarsening technique, in accordance with an embodiment of the invention.

FIG. 25 is a flow chart illustrating a process 2800 for coarsening a quadrilateral mesh using a partial chord extraction technique, in accordance with an embodiment of the invention. Process 2800 is described in connection with an example illustrated in FIGS. 26A-F. The order in which some or all of the process blocks appear in process 2800 should not be deemed limiting. Rather, one of ordinary skill in the art having the benefit of the present disclosure will understand that some of the process blocks may be executed in a variety of orders not illustrated.

The partial chord extraction technique for 2D quadrilateral mesh coarsening is what the name indicates—chords that cross the coarsening region are identified and the portion of the identified chords that cross the coarsening region are extracted from the mesh. However, the merging of the nodes across the partial chord in the extraction process is different than illustrated in FIG. 10. Rather than merging nodes directly opposite, which define the edges of the quadrilateral chord, a shift in the node pairs is performed in order to maintain an all-quadrilateral (non-hybrid) mesh.

The partial chord extraction technique begins by identifying a coarsening region 2905 localized within a portion of an initial mesh 2900 (process block 2805). In the illustrated embodiment, initial mesh 2900 is a non-hybrid, conformal, quadrilateral mesh. In a process block 2810, coarsening paths 2910 through coarsening region 2905 are identified and the constituent mesh elements removed (process block 2815). Coarsening paths 2910 are portions of chords that pass through coarsening region 2905. The chords are "clipped" at the boundary of coarsening region 2905 and therefore referred to as "partial chords."

In a process block 2820, shifted nodes pairs are identified along opposite sides of coarsening paths 2910. The end nodes along each coarsening path 2910 are paired with opposing nodes on the opposite side of their respective coarsening path 2910, but shifted by one. An example of this is illustrated in FIG. 26C. As previously mentioned, the node pairing is shifted in order to maintain an all-quadrilateral mesh. Without shifting, triangular shaped voids would be left at the ends of each extracted partial chord. With shifting, four-sided voids are left, which are subsequently filled with a quadrilateral elements.

In a process block 2825, each of the shifted node pairs are merged into a single node to collapse coarsening path 2910. Upon collapsing coarsening paths 2910, quadrilateral voids remain at the ends of each coarsening path 2910. In a process block 2830, the voids in the mesh are filled with new quadrilateral mesh elements (see FIG. 26E). Once the void is filled, cleanup can be performed by identifying and removing any doublets or other poor node valencies that may have been generated by the partial chord extraction (process block 2835) and mesh smoothing applied to more evenly distribute the mesh elements (process block 2840).

Figure 26:
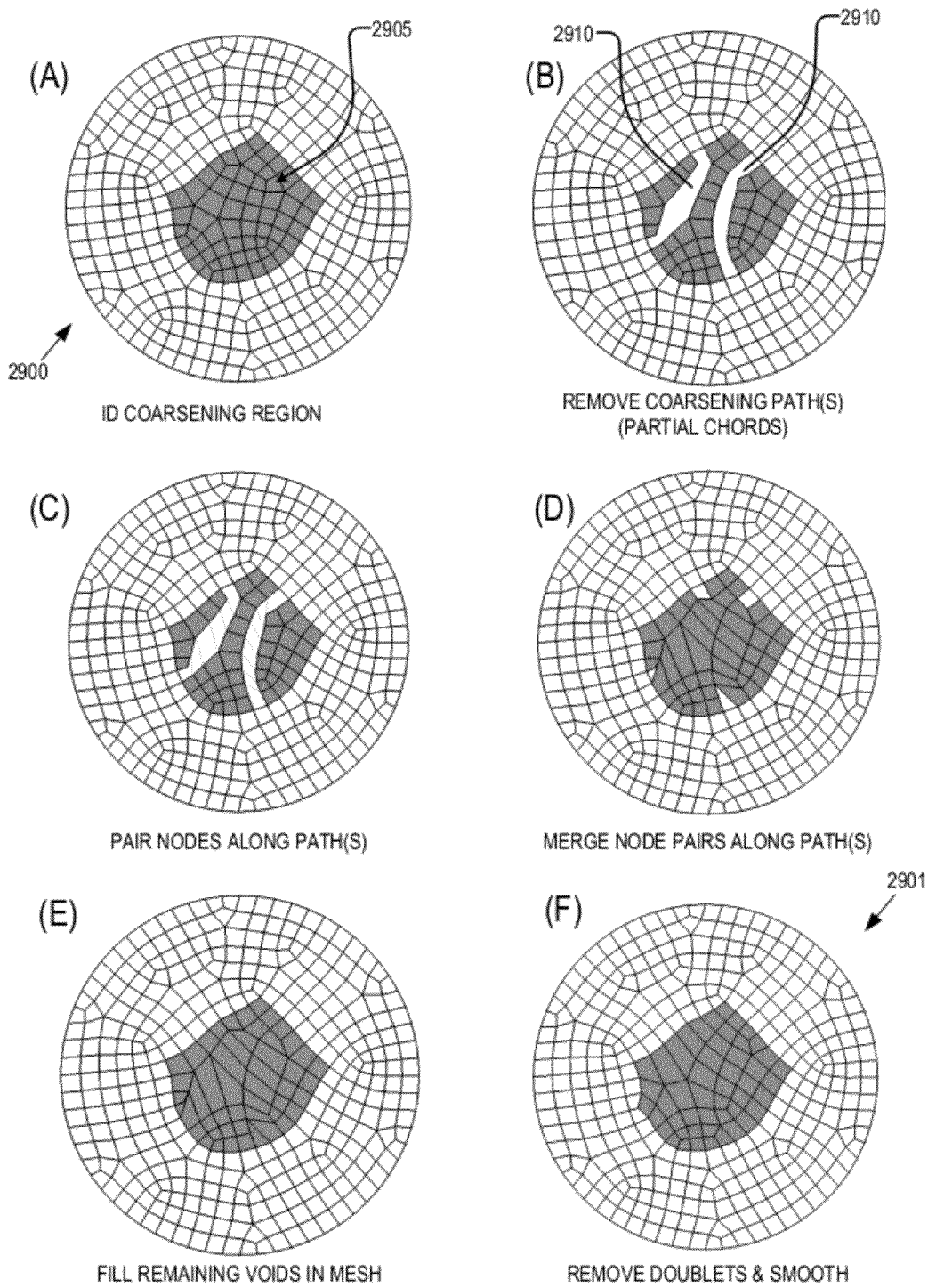
FIGS. 26A-F illustrate the partial chord extraction coarsening technique, in accordance with an embodiment of the invention.

If additional coarsening within coarsening region 2905 is desired (decision block 2845), then process 2800 can be iterated multiple times until the desired degree of coarsening is achieved. Any combination of non-intersecting partial chords (or coarsening paths) can be chosen for extraction in any given iteration. The example of FIG. 26 is merely one possible selection of partial chords and iterations. The disadvantage of the partial chord extraction technique is that the node shift requires that no terminal boundary curves of the mesh intersect the portion of the chord to be extracted. For mesh models which have significant geometric constraints, or when coarsening is requested immediately adjacent to a terminal boundary, this can be problematic. As such, this technique may be most applicable to regions of a mesh which are away from geometric curve constraints.

Finally, in a process block 2850, the final coarsened mesh 2901 is rendered to a display screen or written to disk or memory. It should be appreciated that intermediate coarsened meshes may also be rendered to a display screen for each iteration, if so desired. Furthermore, smoothing may be performed with each iteration (as illustrated), or once upon completion of the final iteration.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (i.e., stores) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method executed on a computing device, the computer implemented method for coarsening a quadrilateral mesh, the computer implemented method comprising:
    identifying a coarsening region within the quadrilateral mesh to be coarsened;
    removing quadrilateral elements along a path through the coarsening region, wherein the path changes between chords within the coarsening region;
    identifying node pairs along opposite sides of the path;
    merging the node pairs along the path to collapse the path; and
    inserting one or more template elements at one or more locations within the coarsening region where the path changes between the chords, wherein each of the chords include a series of the quadrilateral elements connected through opposite edges of the quadrilateral elements and, which starts and stops on a terminal boundary of the quadrilateral mesh or loops back on itself.

2. The computer implemented method of claim 1, wherein the path is limited in extent to the coarsening region within the quadrilateral mesh and wherein the coarsening region is localized to less than an entire portion of the quadrilateral mesh.

3. The computer implemented method of claim 2, wherein the one or more template elements comprise three connected quadrilateral elements, wherein inserting the one or more template elements at the one or more locations comprises replacing a single quadrilateral element with the three connected quadrilateral elements.

4. The computer implemented method of claim 2, further comprising performing an additional coarsening iteration on the coarsening region by repeating the removing of the quadrilateral elements, the inserting of the one or more template elements, the identifying of the node pairs, and the merging of the node pairs.

5. A computer implemented method executed on a computing device, the computer implemented method for coarsening a quadrilateral mesh, the computer implemented method comprising:
    identifying a coarsening region within the quadrilateral mesh to be coarsened;
    removing quadrilateral elements along a path through the coarsening region;
    identifying node pairs along opposite sides of the path; and
    merging the node pairs along the path to collapse the path, wherein the path comprises a partial chord having ends terminating at boundaries of the coarsening region, wherein the coarsening of the quadrilateral mesh is limited to the coarsening region and the boundaries of the coarsening region are internal to the quadrilateral mesh and do not coincide with a terminal boundary of the quadrilateral mesh.

6. The computer implemented method of claim 5, wherein the quadrilateral mesh comprises a two-dimensional finite element mesh, wherein the quadrilateral mesh includes only quadrilateral elements, and wherein the quadrilateral mesh comprises a conformal mesh with all mesh nodes forming a corner of a corresponding quadrilateral element of the quadrilateral mesh.

7. The computer implemented method of claim 5, wherein identifying the node pairs along opposite sides of the path comprises identifying the node pairs shifted by one along opposite sides of the path.

8. The computer implemented method of claim 7, wherein merging the node pairs along the path to collapse the path creates quadrilateral voids at ends of the partial chords along the boundaries of the coarsening region, the method further comprising:
    filling the voids after merging the node pairs with new mesh elements.

9. A machine-accessible, non-transitory medium that provides instructions that, if executed by a machine, will cause the machine to perform operations comprising: identifying a coarsening region within a quadrilateral mesh to be coarsened; removing quadrilateral elements along a path through the coarsening region, wherein the path changes between chords within the coarsening region; identifying node pairs along opposite sides of the path; merging the node pairs along the path to collapse the path; and inserting one or more template elements at one or more locations within the coarsening region where the path changes between the chords, wherein each of the chords include a series of the quadrilateral elements connected through opposite edges of the quadrilateral elements and, which starts and stops on a terminal boundary of the quadrilateral mesh or loops back on itself.

10. The machine-accessible, non-transitory medium of claim 9, wherein the quadrilateral mesh comprises a two-dimensional finite element mesh, wherein the quadrilateral mesh includes only quadrilateral elements, and wherein the quadrilateral mesh comprises a conformal mesh with all mesh nodes forming a corner of a corresponding quadrilateral element of the quadrilateral mesh.

11. The machine-accessible, non-transitory medium of claim 9, wherein the path is limited in extent to the coarsening region within the quadrilateral mesh and wherein the coarsening region is localized to less than an entire portion of the quadrilateral mesh.

12. The machine-accessible, non-transitory medium of claim 11, further comprising saving the quadrilateral mesh having fewer quadrilateral elements within the localized region to a memory device.

13. The machine-accessible, non-transitory medium of claim 11, wherein the one or more template elements comprise three connected quadrilateral elements, wherein inserting the one or more template elements at the one or more locations comprises replacing a single quadrilateral element with the three connected quadrilateral elements.

14. The machine-accessible, non-transitory medium of claim 11, further comprising performing an additional coarsening iteration on the coarsening region by repeating the removing of the quadrilateral elements, the inserting of the one or more template elements, the identifying of the node pairs, and the merging of the node pairs.

15. The machine-accessible, non-transitory medium of claim 11, further comprising smoothing the localized region of the quadrilateral mesh to more uniformly distribute remaining quadrilateral elements within the localized region.

16. A machine-accessible, non-transitory medium that provides instructions that, if executed by a machine, will cause the machine to perform operations comprising: identifying a coarsening region within a quadrilateral mesh to be coarsened; removing quadrilateral elements along a path through the coarsening region; identifying node pairs along opposite sides of the path; and merging the node pairs along the path to collapse the path, wherein the path comprises a partial chord having ends terminating at boundaries of the coarsening region, wherein the coarsening of the quadrilateral mesh is limited to the coarsening region and the boundaries of the coarsening region are internal to the quadrilateral mesh and do not coincide with a terminal boundary of the quadrilateral mesh.

17. The machine-accessible, non-transitory medium of claim 16, wherein identifying the node pairs along opposite sides of the path comprises identifying the node pairs shifted by one along opposite sides of the path.

18. The machine-accessible, non-transitory medium of claim 17, wherein merging the node pairs along the path to collapse the path creates quadrilateral voids at ends of the partial chords along the boundaries of the coarsening region, the method further comprising: filling the voids after merging the node pairs with new mesh elements.

19. A system, comprising:
 a processor to execute instructions; and
 a memory device coupled to the processor and having the instructions stored thereon, which when executed by the processor, will cause the processor to perform operations comprising:
  identifying a coarsening region within a quadrilateral mesh to be coarsened;
  removing quadrilateral elements along a path through the coarsening region, wherein the path changes between chords within the coarsening region;
  identifying node pairs along opposite sides of the path;
  merging the node pairs along the path to collapse the path; and
  inserting one or more template elements at one or more locations within the coarsening region where the path changes between the chords, wherein each of the chords include a series of the quadrilateral elements connected through opposite edges of the quadrilateral elements and, which starts and stops on a terminal boundary of the quadrilateral mesh or loops back on itself.

20. The system of claim 19, wherein the one or more template elements comprise three connected quadrilateral elements, wherein inserting the one or more template elements at the one or more locations comprises replacing a single quadrilateral element with the three connected quadrilateral elements.

21. The system of claim 19, wherein the instructions comprise further instruction, which when executed by the processor, will cause the processor to perform further operation comprising:
 performing an additional coarsening iteration on the coarsening region by repeating the removing of the quadrilateral elements, the inserting of the one or more template elements, the identifying of the node pairs, and the merging of the node pairs.

22. The system of claim 19, wherein the quadrilateral mesh comprises a two-dimensional finite element mesh, wherein the quadrilateral mesh includes only quadrilateral elements, and wherein the quadrilateral mesh comprises a conformal mesh with all mesh nodes forming a corner of a corresponding quadrilateral element of the quadrilateral mesh.

\* \* \* \* \*